F. HILDEBRANDT.
PETROLEUM-STOVE.
No. 184,078.  Patented Nov. 7, 1876.
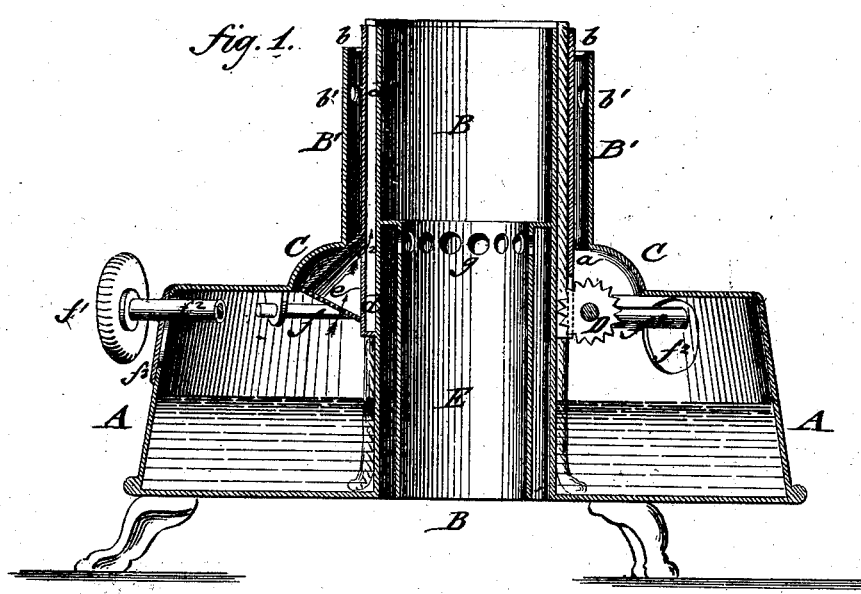
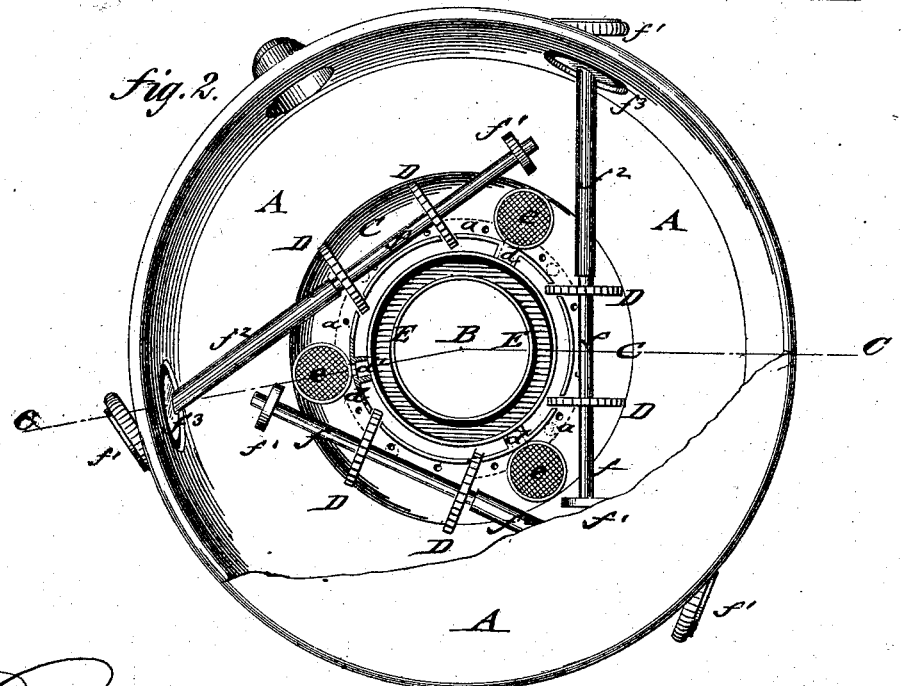
WITNESSES:
Gustave Dieterich
John Goethals
INVENTOR:
F. Hildebrandt
BY
ATTORNEYS.

UNITED STATES PATENT OFFICE.

FREDRICK HILDEBRANDT, OF NEW YORK, N. Y.

IMPROVEMENT IN PETROLEUM-STOVES.

Specification forming part of Letters Patent No. 184,078, dated November 7, 1876; application filed September 30, 1876.

*To all whom it may concern:*

Be it known that I, FREDRICK HILDEBRANDT, of the city, county, and State of New York, have invented a new and Improved Petroleum Cooking Stove, of which the following is a specification:

In the accompanying drawing, Figure 1 represents a vertical transverse section on line $c$ $c$, Fig. 2, of my improved petroleum cooking-stove; and Fig. 2, a bottom view of the same, with part of the bottom removed, to show interior construction.

Similar letters of reference indicate corresponding parts.

The invention relates to improvements in the burner of lamp for petroleum cooking-stoves, by which the oil vapors are conducted from the interior of the oil-reservoir to the flame for complete combustion, and in which the spur-wheels for operating the wicks are arranged at the interior of the reservoir, so as to present a smooth top surface, which has a better appearance, and may be kept clean with greater ease.

The invention consists of an oil-reservoir, whose side and top part are made of one piece of sheet metal, with a raised annular center part, that communicates by small perforations, and a cylindrical conducting-tube, perforated at the top with the upper part of the burner. The burner is of circular shape, and provided between the wick-section with double radial partitions, forming channels, through which the oil vapors are conducted into the flame. The lower part of these channels communicates, by conical openings covered with wire-gauze, with the interior of the reservoir. The spur-wheels for operating the wicks are placed below the top of the oil-reservoir, and inserted and taken out through side openings and supporting-plates, and protected against leaking by stem-inclosing tubes. The lower part of the burner is kept cool by an air-chamber formed by a cylindrical or conical tube, that is open at the lower part and perforated at the upper part.

In the drawing, A represents the oil-reservoir or bowl of my improved lamp for petroleum cooking-stoves, which is placed on suitable feet to give ready access of air to the circular burner B, that extends through the central open part of the reservoir. The side wall and top part of the reservoir are stamped or spun out of one piece of sheet metal, which is fitted by a raised annular part or molding, C, around the burner B. The raised part C is of conical or curved shape, and arranged for the twofold purpose of providing a funnel-shaped space for collecting and conducting the oil vapors in upward direction to the burner, and also for the purpose of placing the wick-operating parts directly below the top part of the reservoir instead of above the same, the raised molding providing the required space for the spur-wheels. A cylindrical tube, B', extends around the burner, leaving an annular space, through which the oil vapors may pass up. The vapors enter to the tube B' by small holes $a$ of the quadrantal molding, and are drawn upward to the flame by top aperture $b$ of tube B' and draft-holes $b'$ at the side of the same. The vapors are thereby continually fed under admixture of air to the flame, so as to be entirely consumed without creating any obnoxious odors. The burner B is arranged with radial partitions $d$, for the purpose of admitting the use of the common flat wicks. The partitions $d$ serve to guide the wicks, and form, also, by arranging two partitions between adjoining wicks, narrow channels $d^1$, which are extended downward into the reservoir A, and communicate, by openings $d^2$ and conical mouths $e$, with the upper part of the reservoir. The conical mouths $e$ are arranged just below the raised molding C, and provided with wire-gauze, to prevent any possible danger of explosion. The vapors are continually drawn upward by the flame and consumed at the upper end of the partition-channels, so that a flame without break is produced, as the burning vapors fill up the small gaps between the wicks. The operating stems or rods $f$ of the spur-wheels D, that raise and lower the wicks, turn in bearings $f^1$, immediately below the top of the reservoir, and also in guide-tubes $f^2$, that extend from the side wall of the reservoir to a point near the first spur-wheel. The tubes $f^2$ are secured to plates $f^3$, that are soldered to the outside of the reservoir, of such size as to close side holes of the same, through which at any time, by removing the closing-plates, the spur-wheels may be taken out for repairs. The tubes $f^2$ extend a short distance to the outside of the reservoir and prevent any leaking of oil. Suitable hand-wheels at the outer ends of the rods $f$ serve to turn them for adjusting the wicks.

The advantage of arranging the wick-operating parts at the inside of the reservoir, but so as to provide ready access for repairs, consists in the fact that the top part is thereby perfectly smooth, without obstructing parts in which oil, dirt, and other impurities may collect. This I consider an essential point of my lamp, as the same can thereby be kept always neat and clean without any trouble.

For the purpose of keeping the lower part of the burner or wick-tube in cool state, a conical or cylindrical tube, E, is arranged at the interior lower part of the burner B, and extended to the height to which the same is within the reservoir. The tube E is open at the lower part, and attached to the burner at the top, where suitable side holes $g$ keep up a continuous circulation of air between the burner and tube E, so as to avoid the heating of the oil and any danger of explosion.

Having thus described my invention, I claim as new and desire to secure by Letters Patent—

1. A petroleum cooking-stove having the bowl A, molding C, and tube B constructed in one piece, and arranged with respect to the burner, as shown and described.

2. The combination of annular raised part C, by exit-holes $a$, with a burner surrounding tube B, provided with vapor-issuing top openings $b$ and side draft-holes $b'$, substantially as specified.

3. The circular burner B, provided with double partitions between wick-sections, to form channels for escape of oil vapors, substantially as described.

4. The combination of double partitions and vapor channels of the burner with lower apertures and conical mouths, covered by wire-gauze, to draw up the oil-vapors to obviate danger of explosion, substantially as specified.

5. The combination of the wick-operating rods or stems $f$ with the guide-tubes $f^2$, applied to closing-plates $f^3$ of the reservoir, to prevent leaking of oil, as described.

6. The combination of the spur-wheels and stems with the guide-tubes $f^2$, closing-plates $f^3$, and recesses of reservoir, to admit taking out of wick-raising parts for repairs, substantially as set forth.

FREDRICK HILDEBRANDT.

Witnesses:
PAUL GOEPEL,
C. SEDGWICK.